United States Patent [19]
Tanji et al.

[11] 3,838,744
[45] Oct. 1, 1974

[54] BODY WEIGHT MEASURING DEVICE

[75] Inventors: Mikiharu Tanji, Watarai; Masanori Yamagiwa, Ise City, both of Japan

[73] Assignee: ISE Electronics Corporation, Ise City, Mie Prefecture, Japan

[22] Filed: June 28, 1973

[21] Appl. No.: 374,333

[30] Foreign Application Priority Data
June 30, 1972 Japan.............................. 47-77468

[52] U.S. Cl.............. 177/177, 177/210, 177/DIG. 3
[51] Int. Cl. ........................ G01g 23/30, G01g 3/14
[58] Field of Search................ 177/177, 210, DIG. 3

[56] References Cited
UNITED STATES PATENTS
3,163,247  12/1964  Bell et al........................ 177/DIG. 3
3,381,767  5/1968  Rairigh ............................ 177/210 X

*Primary Examiner*—George H. Miller, Jr.
*Attorney, Agent, or Firm*—Dike, Bronstein, Roberts, Cushman & Pfund

[57] ABSTRACT

In a body weight measuring device of the type wherein the body weight is displayed by digital display tubes, the display tubes and a source switch are combined into a display unit which is connected to the weight measuring device through an electric cable.

3 Claims, 6 Drawing Figures

BODY WEIGHT MEASURING DEVICE

BACKGROUND OF THE INVENTION

This invention relates to a body weight measuring device of the type wherein the weight of a human body is displayed on a digital display means.

In the prior art, a body weight measuring device of the type referred to above, comprises a platform adapted to support a human body to be weighed, a converter positioned beneath said platform for converting the downward movement of the platform which is caused by the weight of the human body into an electrical signal, a display unit including a plurality of digit display tubes for providing visual display of the numerical value of the weight of the human body, and a source switch for connecting the converter and the display unit across a source of supply. The display unit is mounted on the platform just in the same manner as a scale and a pointer which is rotated along the scale in response to the downward movement of the platform. The source switch is also mounted on or near the platform. For this reason, it is difficult for a man standing on the platform to read the displayed digits and he must bow his body to operate the source switch. Moreover, it has been necessary to maintain the source switch in its closed position for a relatively long period because it takes a certain time for the platform to reach a stable condition after a person to be weighed is supported thereon. Furthermore, with the prior art weighing device it has been difficult to digitally display the weighed weight at a plurality of discrete locations.

SUMMARY OF THE INVENTION

Accordingly, it is an object of this invention to provide a new and improved body weight measuring device capable of providing a readily visible digital display of the weight.

Another object of this invention is to provide an improved body weight measuring device including a source switch which can be operated readily only when the display of the weighed weight is to be made.

Still another object of this invention is to provide a body weight measuring device including a digital display unit and a source switch which can be supported at any desired height above the platform suitable for reading and manipulation.

A further object of this invention is to provide an improved body weight measuring device capable of digitally displaying the weighed weight at a plurality of locations remote from the platform.

According to a broad aspect of this invention these and further objects can be accomplished by providing a body weight measuring device of the type comprising a base, a platform resiliently mounted on the base, said platform displacing downwardly when a body being weighed is supported thereon, means for converting the downward movement of the platform into an electric signal, a display tube connected to display the electric signal and a source switch for controlling the connection between a source of supply and the converting means and the display tube, characterized in that the display tube and the source switch are combined into a display unit and that the display unit is connected to the converting means through an electric cable outside of the base.

With this improved construction, the body weight of a person can be readily read on the display tube while he holds the display unit in his hand or by mounting the display unit on a nearby wall at a height of the eyes. Further, he can readily operate the weighing device by manipulating the source switch incorporated into the display unit.

The cable may be connected to the base through cooperating plug and socket or housed in the base by means of a retriever. If desired, a plurality of independent display units may be connected to the base through discrete cables in order to enable to indicate body weight at different locations.

DESCRIPTION OF THE PREFERRED EMBODIMENTS

Figure 1:
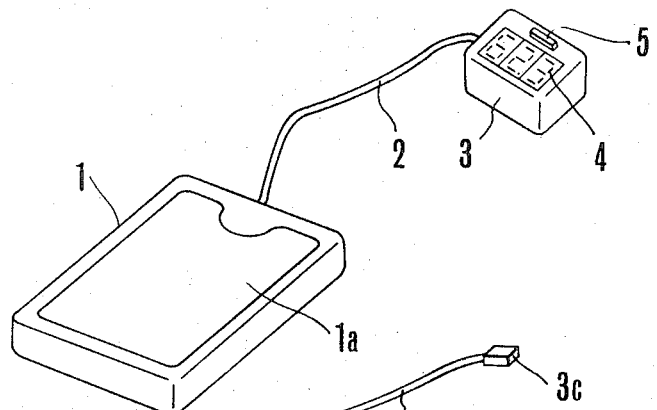
FIG. 1 is a diagrammatic perspective view of one embodiment of this invention.

A preferred embodiment of this invention shown in FIG. 1 comprises a platform 1a adapted to support a human body to be weighed. As in the conventional weighing device, the platform 1a is resiliently supported on a base 1 by means of spring means, not shown, so that platform 1a moves downwardly a little when a body to be weighed is supported thereon. A suitable converter, not shown, is provided beneath the platform so as to convert this downward displacement of the platform into an electrical signal.

According to this invention, a display unit 3 including a plurality of digit display tubes 4 is connected to the converter through an electric cable 2 having a suitable length so that the electric signal is decoded by a suitable decoder, not shown, for selectively operating the digit display tubes, thereby providing a visible digital display of the body weight. Furthermore, in accordance with this invention, a source switch 5, that is a switch for connecting the signal converter, decoder and display tubes 4 across a source of supply, not shown, is incorporated into the display unit 3.

In operation, a man whose body weight is to be measured steps on platform 1a while holding the display unit 3 in one hand. After the platform reaches a stable condition he closes the source switch 5 to digitally display his weight on digit display tubes 4. When the displayed digits are recorded, he opens the source switch and gets down.

In this manner, since the man himself holds the display unit in his hand he can readily read the displayed digits, and since the source switch is closed only when the displayed digits are to be read, it is possible to shorten the period of energization of the electric circuitry thereby reducing the power concerned thereby and increasing their lives.

Although in the foregoing description it was assumed that the man being weighed holds the display unit in his hand, in this case, the weight of the display unit will also be displayed. Although the error caused by the weight of the display unit is negligibly small, such error can be readily eliminated by providing a suitable compensating circuit for the signal converter for the purpose of subtracting the weight of the display unit from the weight measured by the platform. Alternatively, the display unit may be hung on a nearby wall at the level of the eyes.

Figure 2:
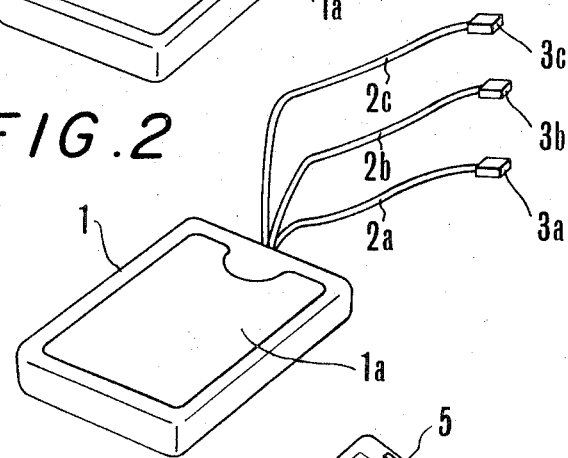
FIG. 2 shows a similar view of a modification wherein a plurality of display units are used.
Figure 2:
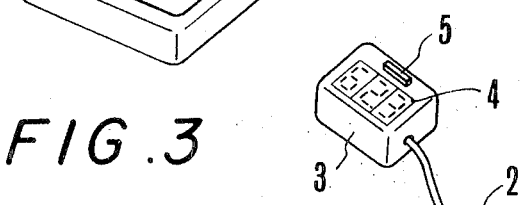

FIG. 2 shows a modified embodiment of this invention in which a plurality of discrete display units 3a, 3b and 3c are connected in parallel to the signal converter located beneath the platform 1a through discrete electric cables 2a, 2b and 2c, and at least one of the display units is provided with a source switch. This modification is suitable for measuring the body weight of students in a school so as to permit each of the students, measurer and recorder to operate the source switch and to read the displayed digits.

Figure 3:
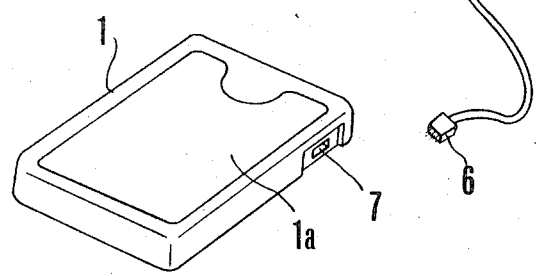
FIG. 3 is a perspective view of another modification wherein cooperating plug and socket are used for connecting the display unit to the base.

FIG. 3 shows a perspective view of a further modification of this invention in which the electric cable 2 is detachably connected to base 1 by means of cooperating plug 6 and socket 7. This modified construction permits one to independently put away the base and platform, and the cable and display unit.

Figure 4:
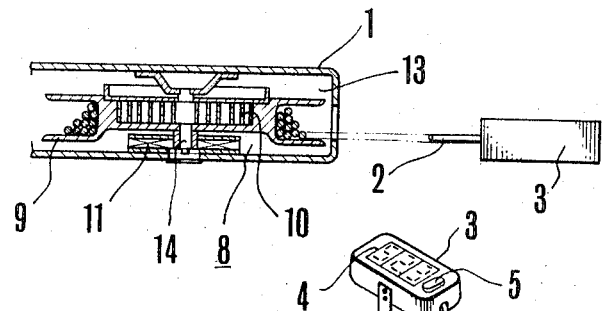
FIG. 4 shows a sectional view of a portion of the base containing a retriever for a display unit.

FIG. 4 shows a section of a portion of a base 1 containing a cable retriever 8 which comprises a reel 9 adapted to take up cable 2 connected to display unit 3, a spiral spring 10 interposed between reel 9 and a shaft 14, a group of sliding contacts 11 between cable conductors and the circuits contained in the base. Although not shown in the drawing, it is to be understood that a suitable mechanism for applying and removing a braking force to and from the reel 9 is provided in the same manner as in the prior art cable retriever so that when the display unit 3 is released it can be automatically retrieved in the base. Thus, when the weighing device is not used, the cable 2 is contained in the base 1 so that it is easy to handle or transport the weighing device.

Figure 5:
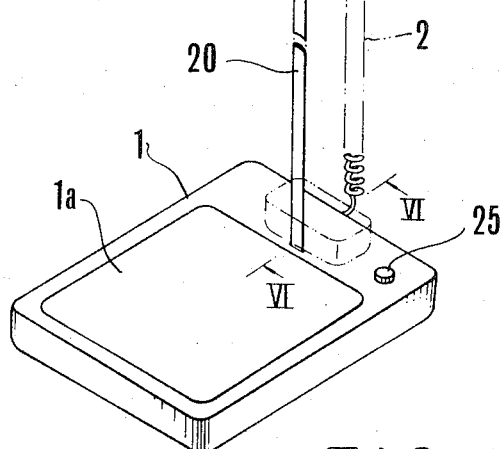
FIG. 5 is a perspective view of yet another embodiment of this invention.
Figure 6:
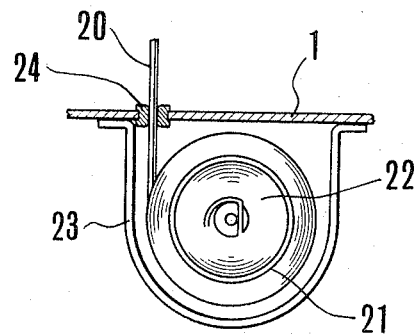
FIG. 6 is a sectional view of a portion of the base taken along a line V1—V1 shown in FIG. 5.

In another modification of this invention shown in FIGS. 5 and 6 a display unit 3 having the same construction as that shown in FIG. 1 is mounted on the upper end of a steel band 20 constructed to extend and contract in the vertical direction. The steel band has a curved cross-section so that it does not bend away from the vertical position when it is pulled upwardly as shown in FIG. 5. The inner end of the steel band is wound about a reel 21 which is biased to take up the steel band by the action of a spiral spring 22. The coil of the steel band wrapped about reel 21 is housed in a housing 23. A frictional bushing 24 is mounted in an opening of base 1 so as to prevent the steel band from being depressed downwardly or wound about reel 21 by the weight of the display unit 3. With this construction, it is possible to support the display unit 3 at any desired height above the platform 1a.

If desired an adjusting knob 25 may be provided for base 1 for compensating the weight of suit worn by the human body to be weighed or an error of measurement. By mounting the display unit on the upper end of the steel band at an angle with respect to the horizontal the digits displayed can be more readily read.

What is claimed is:

1. In a body weight measuring device of the type comprising a base, a platform resiliently mounted on said base, said platform displacing downwardly when a body being weighed is supported thereon, means for converting the downward movement of said platform into an electric signal, a display tube connected to display said electric signal and a source switch for controlling the connection between a source of supply and said converting means and said display tube, the improvement wherein said display tube and said source switch are combined into a display unit and said display unit is connected to said converting means through an electric cable outside of said base and wherein an automatic retriever for taking up said cable is provided for said base.

2. In a body weight measuring device of the type comprising a base, a platform resiliently mounted on said base, said platform displacing downwardly when a body being weighed is supported thereon, means for converting the downward movement of said platform into an electric signal, a display tube connected to display said electric signal and a source switch for controlling the connection between a source of supply and said converting means and said display tube, the improvement wherein said display tube and said source switch are combined into a display unit and said display unit is connected to said converting means through an electric cable outside of said base and wherein said display unit is mounted on the top of a steel band which is mounted on said base to be extendable and contractable in the vertical direction.

3. The body weight measuring device according to claim 2 wherein the lower end of said steel band is connected to a reel which is spring biased to take up said steel band.

* * * * *